United States Patent [19]

Braun

[11] Patent Number: 5,048,656
[45] Date of Patent: Sep. 17, 1991

[54] FLUID OPERATED CLUTCH CONTROL SYSTEM HAVING LATCH MEMBER

[75] Inventor: Eugene R. Braun, Royal Oak, Mich.

[73] Assignee: Eaton Corporation, Cleveland, Ohio

[21] Appl. No.: 574,841

[22] Filed: Aug. 29, 1990

[51] Int. Cl.[5] .................. F16D 25/08; F16D 13/58
[52] U.S. Cl. ...................... 192/85 C; 92/18; 92/19; 92/24; 192/91 R; 192/114 R
[58] Field of Search ............... 92/18, 19, 15, 28, 24; 91/41, 42; 188/265; 192/114 R, 85 C, 91 A

[56] References Cited

U.S. PATENT DOCUMENTS

| | | | |
|---|---|---|---|
| 2,099,453 | 11/1937 | Searle | 303/89 |
| 2,180,154 | 11/1939 | Lenz | 192/87.14 |
| 2,305,302 | 12/1942 | Mazur | 92/28 X |
| 2,932,282 | 4/1960 | McKinley et al. | 121/40 |
| 3,251,278 | 5/1966 | Royster | 92/18 |
| 3,359,862 | 12/1967 | Modrich | 92/28 X |
| 3,482,666 | 12/1969 | Case et al. | 188/265 |
| 3,759,147 | 9/1973 | Johnsson et al. | 92/19 |
| 3,874,747 | 4/1975 | Case et al. | 188/265 X |
| 4,014,414 | 3/1977 | Yamamoto et al. | 92/18 X |
| 4,116,113 | 9/1978 | Leclerc | 188/265 X |
| 4,697,680 | 10/1987 | Faber et al. | 192/114 R X |
| 4,729,462 | 3/1988 | Braun | 192/0.033 |
| 4,873,824 | 10/1989 | Cox | 92/18 X |

FOREIGN PATENT DOCUMENTS 1496793  1/1978  United Kingdom ............ 92/28

Primary Examiner—Rodney H. Bonck
Attorney, Agent, or Firm—A. E. Chrow

[57] ABSTRACT

Provided is an improved fluid operated clutch control system having a latch member operable to lock the clutch in a selected condition of engagement or disengagement when the fluid pressure falls below a predetermined minimum value. In one embodiment a system (100) is provided in which a latch member (26) is controlled by fluid pressure in a channel (36) in a stationary wall housing (10). In another embodiment, a system (200) is provided in which a latch member (62) is controlled by the combination of fluid pressure sensed by a sensor (64) and the energization and de-energization of a solenoid (60) and, in yet another embodiment, a system (300) is provided with a latch member (62) that is controlled by the energization and de-energization of a solenoid (60).

9 Claims, 2 Drawing Sheets

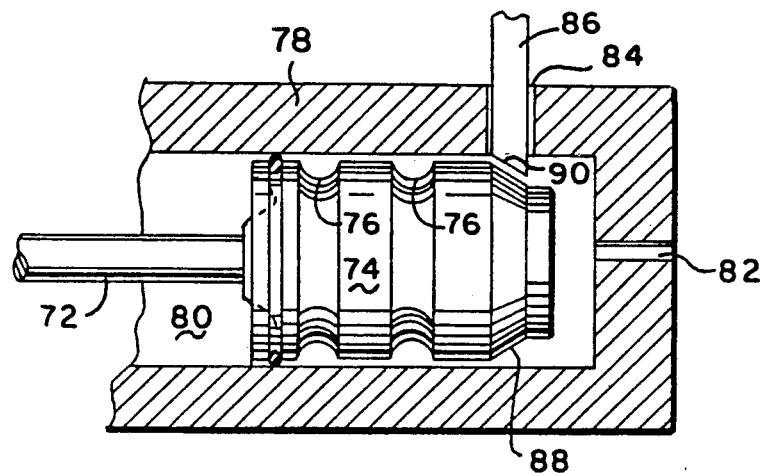
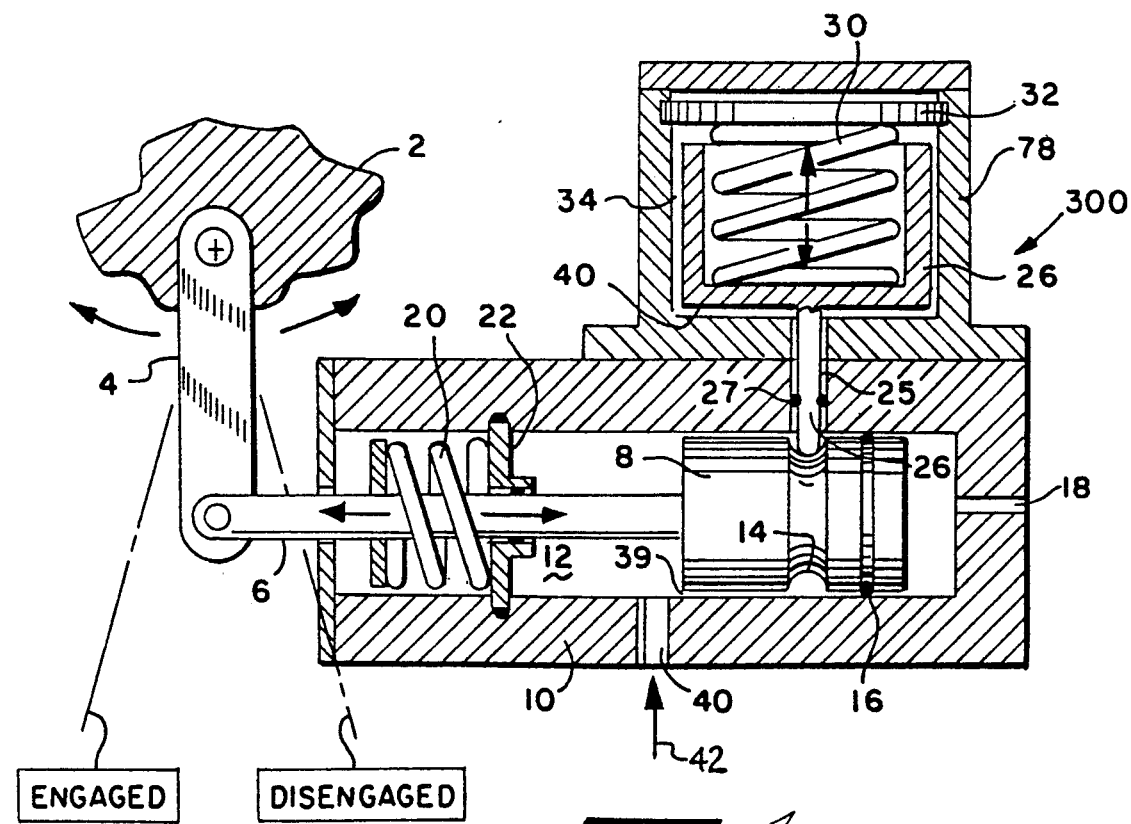

FLUID OPERATED CLUTCH CONTROL SYSTEM HAVING LATCH MEMBER

INTRODUCTION

This invention relates generally to a fluid operated clutch control system operable to enable engagement and disengagement between a driver member and a driven member such as a vehicular engine and change gear transmission and more particularly to an improved clutch control system that includes a latch member operable to lock the clutch in a preselected condition when the fluid pressure is below a predetermined minimum value.

BACKGROUND OF THE INVENTION

A variety of fluid operated clutch control systems for controlling engagement and disengagement of the vehicle master friction clutch between a driver member and driven member, such as a vehicular engine and change gear transmission, have been developed over past years. Early examples of such systems are disclosed in U.S. Pat. No(s). 1,317,029; 2,137,961; 2,137,939 and more recent examples of such systems are disclosed in U.S. Pat. No(s). 3,548,981; 3,719,102; 3,799,309; 4,236,617 and 4,448,293, the disclosures of all of which are incorporated herein by reference.

Locking mechanisms have been employed to a lesser extent in the past to lock vehicle components in selected positions upon the occurrence of one or more predetermined conditions such as the pressure actuated ratchet used in the air brake control system disclosed in U.S. Pat. No. 2,099,453; the fluid actuated latch used in the power shifting mechanism disclosed in U.S. Pat. No. 2,180,154; the ratchet member used in the power system for operating control members disclosed in U.S. Pat. No. 2,932,282, and the latch member used in the automatic clutch control system disclosed in U.S. Pat. No. 4,729,462, the disclosure of all which are incorporated herein by reference and the last of which is owned by the assignee of the present invention.

As disclosed in the above described prior art, the latch members have characteristically been devices that engage external members of the control system whereas the present invention provides a latching member that is operable to enter directly into the fluid chamber containing the pressurized fluid that controls the clutch condition and is thus advantageously effective in locking the clutch in a preselected condition when the fluid pressure is below a predetermined minimum value so as, for example, to prevent the engine from driving the transmission when for some reason the fluid pressure has dropped below the predetermined minimum value and the vehicle is traveling at low speed or alternately, to prevent the engine from disengaging from the transmission to assure engine braking when the vehicle is decending a hill.

SUMMARY OF THE INVENTION

Accordingly, it is an object of this invention to provide an improved fluid operated clutch control system having a latch member operable to lock the clutch in a preselected condition when the fluid pressure is below a predetermined minimum value.

It is another object of this invention to provide an improved fluid operated clutch control system having a latch member that enters the pressurized fluid chamber actuating the clutch and is responsive to lock the clutch in a preselected condition when the fluid pressure is below a predetermined minimum value.

BRIEF DESCRIPTION OF THE DRAWINGS

FIG. 3 is a partial central cross-sectional view of head 74 of a piston rod 72 having a tapered surface 88 engagable with the tapered surface 90 on a latch member 86.

FIG. 4 is a central cross sectional view of a clutch control system 300 of the invention that utilizes pressurized fluid directly on the latch member to effect its release.

DESCRIPTION OF SOME PREFERRED EMBODIMENTS

Figure 1:
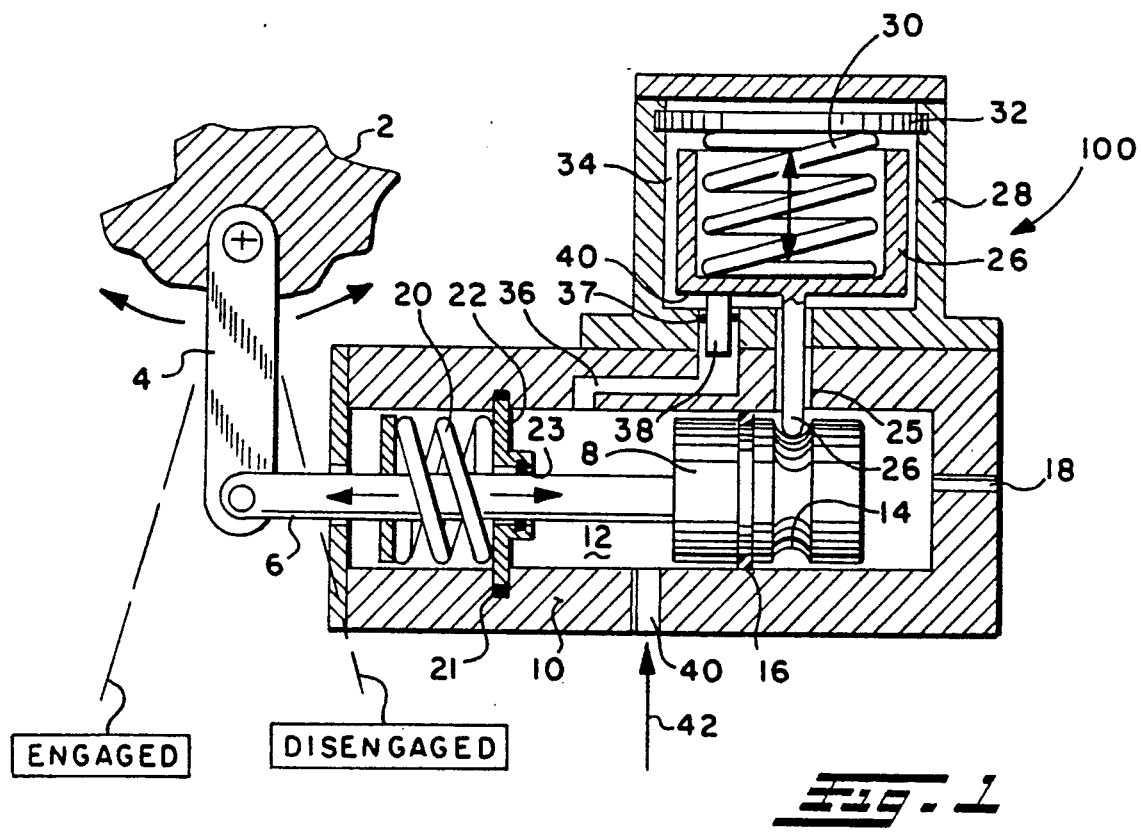
FIG. 1 is a central cross-sectional view of a clutch control system 100 of the invention that utilizes pressured fluid to actuate a latch member 26.

In FIG. 1, clutch 2 is operable to engage and disengage a drive member such as a vehicular engine to a driven member such as a transmission in response to pivotal movement of linkage arm 4 between the two conditions.

Linkage arm 4 is pivoted by reciprocal movement of a movable member such as by the operable connection between arm 4 and piston rod 6 having an enlarged head 8 movably disposed in chamber 12 contained within a surrounding stationary housing wall 10. Head 8 is provided with a suitable fluid seal such as a resilient "O" ring 16 that fluid sealingly engages the inner surface of wall 10 of the housing member.

Pressurized fluid referenced by numeral 42 is introduced into chamber 12 through inlet 40 in wall 10 which also includes a vent opening 18 to prevent air from being compressed in chamber 12 to the right of head 8 when head 8 moves towards the viewer's right.

A plate 22 is secured to wall 10 within chamber 12. Plate 22 has an opening through its center through which piston rod 6 is able to reciprocably move. A seal 23 is provided in plate 22 for sealing equipment with rod 6. Another seal 21 is provided at the outside diameter of plate 22 for sealing engagement with housing 10. A plate 24 is fixedly secured to piston rod 6 in spaced-apart relationship to plate 22. First resilient biasing means, such as a coiled spring 20, is disposed about piston rod 6 between plates 22 and 24 with the result that piston rod 6 is urged towards the viewer's left to move clutch 2 into the engaged condition whenever fluid pressure in chamber 12 is below a predetermined minimum value which, in part can be controlled by the spring constant selected for spring 20.

The engagement and disengagement of clutch 2 is controlled by the introduction of pressurized fluid into chamber 12 through inlet 40 as previously described. Inlet 40 may, of course, also act as an outlet to enable the pressurized fluid to exit chamber 12 according to the means by which the pressurized fluid is being controlled such as by a speed signal that controls optimum change gear shifting points. Hydraulic circuits for controlling engagement and disengagement of clutches are well known and are thus not described in detail herein except to the extent that chamber 12 may have more than one entry for receiving and/or dumping pressurized fluid with various flow restricting orifices for modulating the flow.

Wall 10 has an opening 25 therethrough and piston head 8 is provided with engagement means preferably in the form of an open-sided groove 14 therein facing towards and registerable with opening 25. An elongate portion of a latch member 26 is movably disposed in opening 25 and a "U" cup shaped portion thereof is disposed in chamber 34 enclosed by a surrounding housing wall 28 that is secured to wall 10. Latch member 26 is thus reciprocally movable in chamber 34 and in opening 25.

A second resilient biasing means, such as coiled spring 30, is disposed in chamber 34 within the "U" cup shaped portion of latch member 26 and one end engages a stop plate 32 and the opposite end engages the bottom of the "U" cup shaped section of latch member 26. As a result latch member 26 is urged downwardly as viewed in FIG. 1 so that the lower end of the portion of latch member 26 extending through opening 25 will slide along the outer surface of piston head 8 and enter groove 14 to lockingly secure the movable member at a preselected position determined by the location that latch member 26 enters chamber 12.

A fluid channel 36 extends through wall 10 providing fluid communication between chamber 12 and an end of a pin 38 that is movably disposed in a continuation of channel 36 in wall 10 that extends in a radially outwardly direction from chamber 12. The opposite end of pin 38 is engagable with a contact surface 40 of latch member 26 facing towards chamber 12. Pin 38 is reciprocally movable in channel 36 and preferably includes a fluid seal such as a resilient "O" ring in its outer surface to prevent fluid from leaking past pin 38.

Although the use of pin 38 is preferred, it can be omitted in favor of including a fluid chamber beneath the "U" cup shaped portion of latch member 26 which is then itself preferably provided with fluid seals such as a resilient "O" ring in the outer surface of the "U" cup shaped portion to prevent fluid from exiting into chamber 34.

In operation, when the fluid pressure in chamber 12 is above a predetermined minimum value, the equivalent pressure in channel 36 urges pin 38 into engagement with contact surface 40 and overcomes the resilient biasing force of spring 30 and moves latch member 26 upwardly so that piston head 8 (and rod 6) are able to reciprocate within chamber 12 according to the instruction being given on whether to engage or disengage the clutch. However, when the fluid pressure falls below the predetermined minimum value, the biasing force of spring 30 overcomes the force of pin 38 and urges the end of latch member 26 into groove 14 in piston head 8 which is moved into registration therewith by spring 20. Thus, although linkage arm 4 is shown in FIGS. 1 and 2 in a neutral condition for illustrative purposes, the axial location of opening 25 and the axial length of piston head 8 as well as the selection of spring constants for springs 20 and 30 will enable the latch member to lockingly engage the engagement means in piston head 8 at a location at which the clutch is in a selected one of an engaged or a disengaged condition when the fluid pressure falls below a predetermined minimum value.

Figure 2:
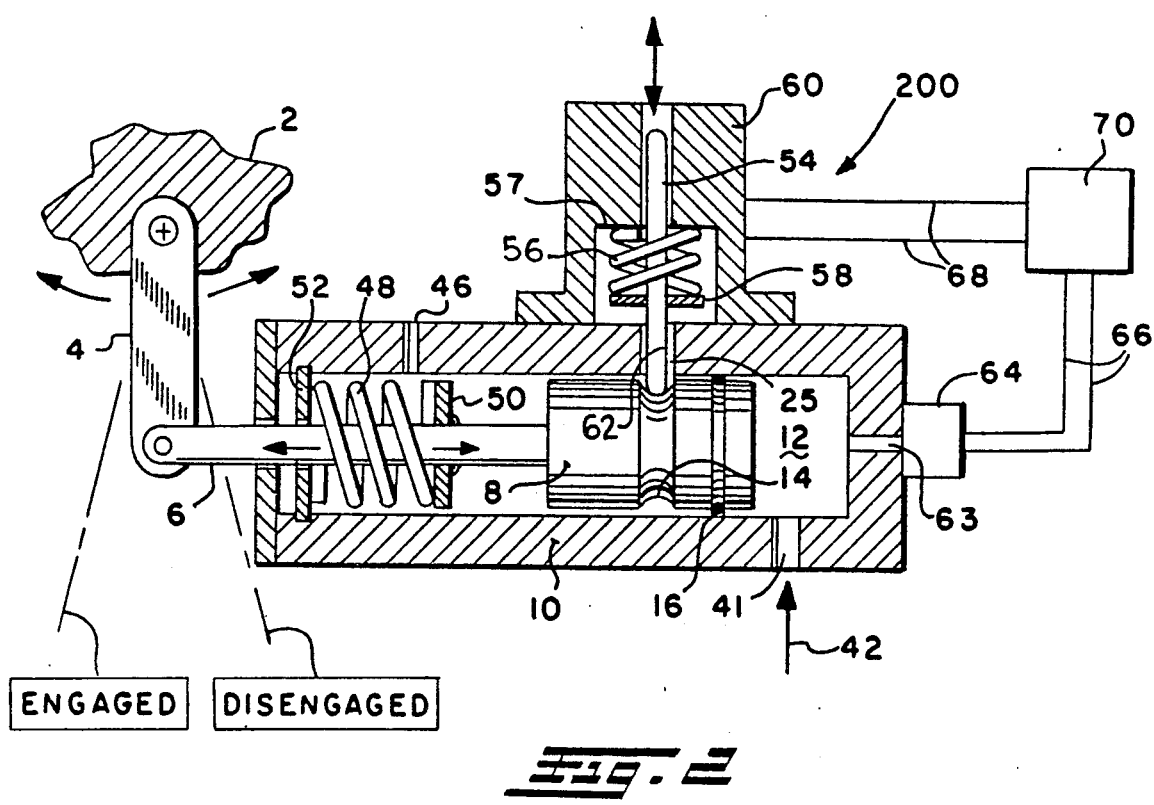
FIG. 2 is a central cross-sectional view of a clutch control system 200 of the invention that utilizes the combination of pressurized fluid and an electrical signal 60 to actuate a latch member 62.

The clutch control system 200 of FIG. 2 is in many respects the same as described for system 100 above. First resilient biasing means in the form of coiled spring 48 has now been disposed in chamber 12 so as to urge piston head 8 (and rod 6) toward the viewer's right when the fluid pressure in chamber 12 falls below a predetermined minimum value. Such is accomplished by locating spring 48 between a plate 50 fixedly secured to rod 6 and a plate 52 secured to wall 10 and having an opening therethrough which rod 6 can reciprocally move.

The latching mechanism of system 200 however is now a function of both fluid pressure and an electrical signal indicative of fluid pressure provided by a fluid pressure sensor 64 secured to wall 10 and operable to monitor fluid pressure in chamber 12 through access opening 63.

It is to be noted that fluid pressure enters chamber 12 through opening 41 on the right side of piston head 8 as viewed in FIG. 2 which causes piston head 8 (and rod 6) to move towards the viewer's left as the pressure overcomes the force of spring 48 causing piston head (and rod 6) to move toward the viewer's right. As such, a vent opening 46 is preferably provided through wall 10 to prevent air from being compressed in the portion of chamber 12 to the left of piston head 8.

An end of an elongate latch member 62 extends through opening 25 in stationary housing wall 10. Latch member 62 is reciprocally movable in opening 25 and has a plate 58 fixedly secured thereto outside of wall 10.

The opposite end of latch member 62 is received in opening 54 of an electrical solenoid 60 powered by a suitable electric power source (not referenced). Solenoid 60 is secured to stationary housing wall 10 and is provided with a surface 57 facing towards chamber 12 that is spaced-apart from plate 58 enabling the positioning of a second resilient biasing means in the form of coiled spring 56 about latch member 62 and between surface 57 and plate 58. Spring 56 is operable to urge latch member 62 downwardly such that its lower end enters chamber 12 and lockingly engages groove 14 in piston head 8 as hereinbefore described for system 100.

In operation, the electrical signal indicative of fluid pressure in chamber 12 sensed by sensor 64 is received by a control module 70 through electrical one or more conductors 66. As long as the fluid pressure is above a predetermined minimum value, module 70 provides an electrical control signal to solenoid 60 through one or more electrical conductors 68 which maintains solenoid 60 in an energized condition operable to overcome the force of spring 56 and prevents the end of latch member 62 from entering chamber 12. When the pressure sensed falls below a predetermined minimum value, solenoid 60 is de-energized and spring 56 is operable to urge the end of latch member 62 into chamber 12 and lockingly engage groove 14 when in registration therewith which occurs as piston head 8 is moved towards the viewer's right by spring 48 when the fluid pressure in chamber 12 falls below the predetermined minimum value.

As in the case of system 100, the axial location of opening 25 and the axial length of head 8 and the selection of spring 48 and 56 can be adapted so as to lock the clutch in a selected one of an engaged or disengaged condition when the fluid pressure in chamber 12 falls below a predetermined minimum value.

Although shown as secured directly to stationary house wall 10, pressure sensor 64 can of course monitor fluid pressure in chamber 12 remotely from housing wall 10 such as by monitoring fluid pressure in tubing conveying the fluid into entry opening 41 as by connecting tubing to access opening 63 and measuring the fluid pressure therein at some remote location.

Alternatively, solenoid 60 can be energized and de-energized according to predetermined conditions of clutch control. For example, in control system 200, when the piston head 8 is to be held in engaged or disengaged position, solenoid 60 is de-energized to allow latch member 62 to lockingly engage groove 14. When piston head 8 is to be reciprocally moveable, solenoid 60 is energized and operable to overcome the force of spring 56 pulling latch member 62 out of chamber 12 preventing engagement with groove 14.

FIG. 3 shows a preferred feature on piston head 74 having piston rod 72 extending therefrom and moveably disposed in chamber 80 enclosed by surrounding housing wall 78. Piston head 74 is essentially the same as piston head 8 previously described. It has latch member engagement means in the form of annular groove 76 facing towards the inner surface of wall 78 that is registerable with an opening 84 through wall 78 through which a latch member 86 is reciprocally moveable. Latch member 86 is operable to lockingly engage groove 76 and lock piston head 74 a preselected position in the manner hereinbefore described.

Piston head 74 includes a tapered surface 88 adapted to engage and urge latch member 86 outwardly from chamber 80 as it moves towards the viewer's right. Such is of advantage in preventing latch member 86 from dropping down into chamber 80 in the space between the end of head 74 and the end of housing wall 78 towards the viewer's right. Preferably the end of latch member 86 that extends into chamber 80 also has a tapered surface 90 that is adapted to engage tapered surface 88 of head 74 to enhance the movement of latch member 86 outwardly from chamber 80.

FIG. 3 also illustrates that the moveable member such as piston head 74 may have more than one open-sided latch member engagement groove such as groove 76' that is spaced apart from groove 76 such that latch member 86 is able to hold the clutch in either the engaged or the disengaged condition according to the groove selected.

The clutch control system 300 of FIG. 4 is in many respects the same as described for system 100.

A second resilient biasing means, such as coiled spring 30, is disposed in chamber 34 within the "U" cup shaped portion of latch member 26 and one end engages a stop plate 32 and the opposite end engages the bottom of the "U" cop shaped section of latch member 26. A fluid pressure sealing member such as a resilient "O" ring 27 is disposed about latch member 26 within opening 25. As a result latch member 26 is urged downwardly as viewed in FIG. 1 so that the lower end of the portion of latch member 26 extending through opening 25 will slide along the outer surface of piston head 8 and enter groove 14 to lockingly secure the moveable member at a preselected position determined by the location that latch member 26 enters chamber 12.

A fluid opening 39 provides fluid communication around the piston head 8 and into opening 25 up to "O"-ring 27 surrounding the lower end of latch member 26 so that when the fluid pressure in chamber 12 is above a predetermined minimum value the fluid pressure engages the lower end of latch member 26 and overcomes the resilient biasing force of spring 30 urging latch member 26 out of engagement with groove 14. Thus piston head 8 (and rod 6) are able to reciprocate within chamber 12 according to the instruction being given on whether to engage or disengage the clutch. However, when the fluid pressure falls below the predetermined minimum value, the biasing force of spring 30 overcomes the force on the lower end of latch member 26 and urges the end of latch member 26 into groove 14 in piston head 8 which is moved into registration therewith by spring 20. Thus, although linkage arm 4 is shown in FIGS. 1 and 2 in a neutral condition for illustrative purposes, the axial location of opening 25 and the axial length of piston head 8 as well as the selection of spring constants for springs 20 and 30 will enable the latch member to lockingly engage the engagement means in piston head 8 at a location at which the clutch is in a selected one of an engaged or a disengaged condition when the fluid pressure falls below a predetermined minimum value.

Although the present invention has been set forth with a certain degree of particularity, it is understood that various modification and substitution and rearrangement of the components are possible without departing from the spirit and scope of the invention hereinafter claimed.

What is claimed:

1. An improved control system for a fluid operated clutch of the type including linkage operable to effect a condition of engagement or disengagement thereof, said system including first resilient biasing means operatively connected to the linkage and a movable member actuated by pressurized fluid having one end disposed within a fluid chamber contained within a stationary housing wall operably connected to the linkage, said system operable such that the first biasing means is adapted to cause the linkage to effect a selected condition of engagement or disengagement of the clutch and the movable member is adapted to correspondingly cause the linkage to effect a selected condition of disengagement or engagement of the clutch when the movable member is actuated by fluid pressure operable to create a force sufficient to overcome the first biasing means, and said improvement characterized by said system including means for latching, the movable member at a preselected position when the fluid pressure falls below a predetermined minimum value, said latching means comprising:

an opening through the housing wall;

engagement means on the movable member facing towards the housing wall and registerable with the housing wall opening;

a latch member extending through the housing wall opening and lockingly engageable with the movable member engagement means at the preselected position;

second resilient biasing means operable to urge the latch member into engagement with the movable member engagement means in registration therewith;

a contact surface on the latch member facing towards the chamber;

a channel extending through the housing wall between the fluid chamber and the contact surface; and a pin movable disposed between the channel and the latch member contact surface, said pin operable to engage said contact surface and impart the force thereagainst operable to overcome the second resilient biasing means when the fluid pressure in the channel is above the predetermined minimum value;

said latching means operable such that, when the fluid pressure in the channel is above the predetermined minimum value, the resultant force of the pin against the contact surface is effective to overcome the second resilient biasing means and prevent the latch member from engaging the movable member engagement means and, when the fluid pressure in the channel between the chamber and the pin is below the predetermined minimum value, the second resilient biasing means is operable to urge the latch member into engagement with the movable member engagement means and lock the movable member at the preselected position.

2. The system of claim 1, wherein the movable member engagement means is an open-sided groove.

3. The system of claim 1, wherein the movable member is a piston.

4. The system of claim 1, wherein the first resilient biasing means is a spring.

5. The system of claim 1, wherein the first and second resilient biasing means are springs.

6. The system of claim 1, wherein the movable member includes a tapered surface operable to urge the latch member outwardly from the fluid chamber upon engagement therewith.

7. The system of claim 6 wherein the latch member includes a tapered surface engagable with the movable member tapered surface.

8. The system of claim 1, wherein the movable member engagement means is more than one open-sided groove.

9. An improved control system for a fluid operated clutch of the type including linkage operable to effect a condition of engagement or disengagement thereof, said system including first resilient biasing means operatively connected to the linkage and a movable member actuated by pressurized fluid having one end disposed within a fluid chamber contained within a stationary housing wall operably connected to the linkage, said system operable such that the first biasing means is adapted to cause the engagement or disengagement of the clutch and the movable member is adapted to correspondingly cause the linkage to effect a selected condition of disengagement or engagement of the clutch when the movable member is actuated by fluid pressure operable to create a force sufficient to overcome the first biasing means, and said improvement characterized by said system including means for latching, the movable member at a preselected position, said latching means comprising:

an opening through the housing wall;
engagement means on the movable member facing towards the housing wall and registerable with the housing wall opening;
a latch member extending through the housing wall opening and lockingly engageable with the movable member engagement means at the preselected position;
a fluid pressure sealing member disposed about the latch member within the opening through the housing wall;
means for providing fluid communication between the fluid chamber and the opening through the housing wall;
second resilient biasing means operable to urge the latch member into engagement with the movable member engagement means in registration therewith;
said latching means operable such that when the fluid pressure in the chamber is above a predetermined minimum the resilient force upon the latch member between the chamber and the sealing member is operative to overcome the second resilient biasing means and prevent the latch member from engaging the movable member engagement means and, when the fluid pressure is below the predetermined minimum, the second resilient biasing means urges the latch member into engagement with the movable member engagement means and locks movable member at the preselected position.

* * * * *